United States Patent
Kim et al.

(10) Patent No.: US 10,483,568 B2
(45) Date of Patent: Nov. 19, 2019

(54) MODULE SYSTEM OF REDOX FLOW BATTERY

(71) Applicant: OCI Company Ltd., Seoul (KR)

(72) Inventors: JaeMin Kim, Seongnam-si (KR); MyungSup Um, Seongnam-si (KR); HeeChang Ye, Seongnam-si (KR)

(73) Assignee: OCI Company Ltd., Seoul (KR)

( * ) Notice: Subject to any disclaimer, the term of this patent is extended or adjusted under 35 U.S.C. 154(b) by 161 days.

(21) Appl. No.: 15/666,706

(22) Filed: Aug. 2, 2017

(65) Prior Publication Data

US 2019/0013534 A1  Jan. 10, 2019

(30) Foreign Application Priority Data

Jul. 7, 2017  (KR) .................. 10-2017-0086643

(51) Int. Cl.
*H01M 8/00* (2016.01)
*H01M 8/04276* (2016.01)
*H01M 8/18* (2006.01)
*H01M 8/04186* (2016.01)

(52) U.S. Cl.
CPC ... *H01M 8/04276* (2013.01); *H01M 8/04186* (2013.01); *H01M 8/188* (2013.01)

(58) Field of Classification Search
CPC .................. H01M 8/188; H01M 8/04276
See application file for complete search history.

(56) References Cited

U.S. PATENT DOCUMENTS

| | | | |
|---|---|---|---|
| 2014/0075745 A1* | 3/2014 | Lu | H01M 4/523 29/623.1 |
| 2016/0351926 A1* | 12/2016 | Hsu | H01M 8/18 |
| 2017/0098849 A1* | 4/2017 | Kumamoto | H01M 8/18 |

* cited by examiner

*Primary Examiner* — Cynthia H Kelly
*Assistant Examiner* — Monique M Wills
(74) *Attorney, Agent, or Firm* — Harness, Dickey & Pierce, P.L.C.

(57) ABSTRACT

A module system of a redox flow battery is disclosed. The system includes a first redox flow battery module, through which first and second electrolytic solutions circulate, a second redox flow battery module, through which first and second electrolytic solutions circulate, first and second storage tanks storing the first electrolytic solutions of the first and second redox flow battery modules, a first main pipe connecting the first redox flow battery module fluidically to the first storage tank, and a first transfer pipe and a first equilibrium pipe which are configured to allow for fluid communication between the first electrolytic solutions of the first and second redox flow battery module. The first main pipe has a diameter greater than that of the first transfer pipe.

9 Claims, 7 Drawing Sheets

MODULE SYSTEM OF REDOX FLOW BATTERY

CROSS-REFERENCE TO RELATED APPLICATIONS

This U.S. non-provisional patent application claims priority under 35 U.S.C. § 119 to Korean Patent Application No. 10-2017-0086643, filed on Jul. 7, 2017, in the Korean Intellectual Property Office, the entire contents of which are hereby incorporated by reference.

BACKGROUND OF THE INVENTION

The present disclosure relates to a module system of a redox flow battery, and in particular, to a module system including a plurality of modules.

With the recent serious shortage of electric power, introduction of natural energy such as wind power generation and solar power generation and stabilization of a power system have become a global issue. To address this issue, there is an increasing interest in large-capacity energy storage technology capable of increasing stability of output power and storing surplus power.

A redox flow battery is one of such large-capacity energy storage devices. The redox flow battery includes a cell that is configured to allow for conversion (i.e., charging and discharging) between chemical energy in electrolyte and electrical energy. The redox flow battery is advantageous for the purpose of stabilizing a power system in that it provides advantages such as easy large capacity, long life, and accurate monitoring of a charging state.

In an energy storage device including a plurality of modules, imbalance in the state-of-charge (SOC) between modules of the redox flow battery leads to problems such as reduction of energy storage capacity and deterioration in performance of the energy storage device.

SUMMARY

Some embodiments of the inventive concept provide a module system of a redox flow battery which is configured to provide improved battery performance without an energy capacity imbalance.

According to some embodiments of the inventive concept, a module system of a redox flow battery may include a first redox flow battery module, through which a first electrolytic solution and a second electrolytic solution circulate, a second redox flow battery module, through which a first electrolytic solution and a second electrolytic solution circulate, a first storage tank storing the first electrolytic solution of the first redox flow battery module, a second storage tank storing the first electrolytic solution of the second redox flow battery module, a first main pipe connecting the first redox flow battery module fluidically to the first storage tank, and a first transfer pipe and a first equilibrium pipe which are configured to allow for fluid communication between the first electrolytic solution of the first redox flow battery module and the first electrolytic solution of the second redox flow battery module. The first main pipe may have a diameter greater than that of the first transfer pipe.

BRIEF DESCRIPTION OF THE DRAWINGS

Example embodiments will be more clearly understood from the following brief description taken in conjunction with the accompanying drawings. The accompanying drawings represent non-limiting, example embodiments as described herein.

Figure 1:
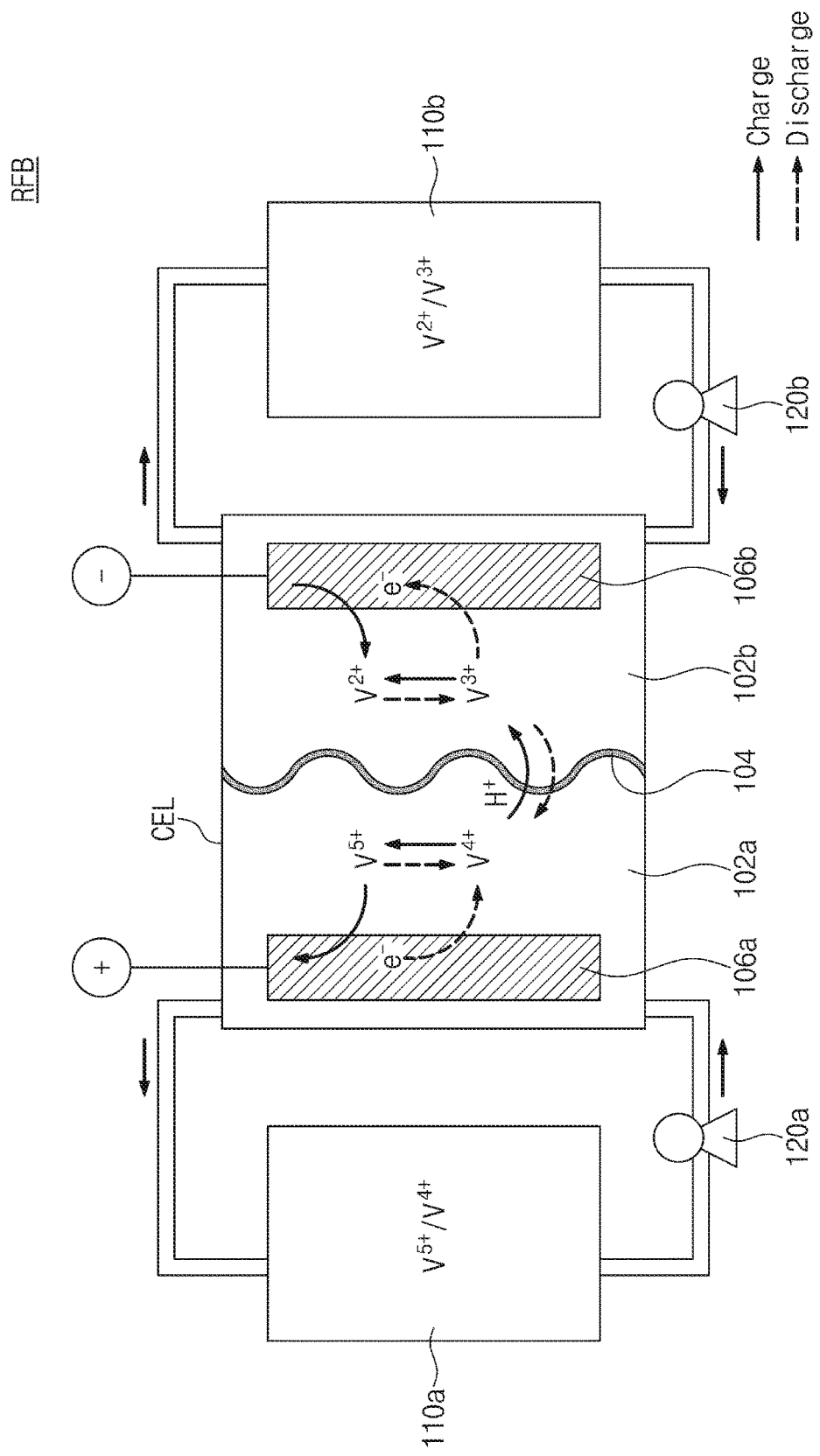
FIG. 1 is a schematic diagram illustrating a cell of a redox flow battery according to some embodiments of the inventive concept.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION

Example embodiments of the inventive concepts will now be described more fully with reference to the accompanying drawings, in which example embodiments are shown. Example embodiments of the inventive concepts may, however, be embodied in many different forms and should not be construed as being limited to the embodiments set forth herein; rather, these embodiments are provided so that this disclosure will be thorough and complete, and will fully convey the concept of example embodiments to those of ordinary skill in the art. In the drawings, the thicknesses of layers and regions are exaggerated for clarity. Like reference numerals in the drawings denote like elements, and thus their description will be omitted.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Like numbers indicate like elements throughout. As used herein the term "and/or" includes any and all combinations of one or more of the associated listed items. Other words used to describe the relationship between elements or layers should be interpreted in a like fashion (e.g., "between" versus "directly between," "adjacent" versus "directly adjacent," "on" versus "directly on").

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof.

FIG. 1 is a schematic diagram illustrating a cell of a redox flow battery according to some embodiments of the inventive concept. Referring to FIG. 1, a redox flow battery RFB, according to some embodiments of the inventive concept, may include a cell CEL, a first storage tank 110a, a first pump 120a, a second storage tank 110b, and a second pump 120b.

The first storage tank 110a may be used to store a first electrolytic solution, and the second storage tank 110b may be used to store a second electrolytic solution. For example, the first electrolytic solution may be a positive-type electrolytic solution, and the second electrolytic solution may be a negative-type electrolytic solution. The first electrolytic solution may contain a vanadium active material such as $V^{4+}$ ion and $V^{5+}$ ion, and the second electrolytic solution may contain a vanadium active material such as $V^{2+}$ ion and $V^{3+}$ ion. Each of the first and second electrolytic solutions may further contain sulfuric acid, hydrochloric acid, or mixed acid thereof. The sulfuric or hydrochloric acid may be used to dissolve the vanadium active material.

The cell CEL may include a positive cell 102a, a negative cell 102b, a first electrode 106a in the positive cell 102a, a second electrode 106b in the negative cell 102b, and an ion exchange layer 104 interposed between the positive and negative cells 102a and 102b. As an example, the first electrode 106a may be a positive electrode, and the second electrode 106b may be a negative electrode.

Each of the first and second electrodes 106a and 106b may provide an active site for an oxidation-reduction reaction in the positive and negative cells 102a and 102b. For example, the first and second electrodes 106a and 106b may include non-woven fabric, carbon fiber, or carbon paper.

The first electrolytic solution in the first storage tank 110a may be supplied into the positive cell 102a through the first pump 120a. When a charging or discharging operation is performed, electrons in the positive cell 102a may flow through the first electrode 106a. For example, during the charging operation, $V^{5+}$ ions may be generated from $V^{4+}$ ions, and electrons may be provided to the first electrode 106a from the positive cell 102a (e.g., oxidation). During the discharging operation, $V^{4+}$ ions may be generated from $V^{5+}$ ions, and electrons may be transferred to the positive cell 102a from the first electrode 106a (e.g., reduction). If the oxidation-reduction reaction in the positive cell 102a is finished, the first electrolytic solution may be returned to the first storage tank 110a. The first pump 120a may be used to circulate the electrolytic solution between the first storage tank 110a and the positive cell 102a.

The second electrolytic solution in the second storage tank 110b may be supplied into the negative cell 102b through the second pump 120b. When a charging or discharging operation is performed, electrons in the negative cell 102b may flow through the second electrode 106b. For example, during the charging operation, $V^{2+}$ ions may be generated from $V^{3+}$ ions, and electrons may be provided to the negative cell 102b from the second electrode 106b (e.g., reduction). During the discharging operation, $V^{3+}$ ions may be generated from $V^{2+}$ ions, and electrons may be transferred to the second electrode 106b from the negative cell 102b (e.g., oxidation). If the oxidation-reduction reaction in the negative cell 102b is finished, the second electrolytic solution may be returned to the second storage tank 110b. The second pump 120b may be used to circulate the electrolytic solution between the second storage tank 110b and the negative cell 102b.

The positive cell 102a and the negative cell 102b may be separated from each other by the ion exchange layer 104. Nevertheless, the ion exchange layer 104 may be configured to allow for transportation of ions (i.e., cross-over) between the positive cell 102a and the negative cell 102b. For example, hydrogen ions ($H^+$) may pass through the ion exchange layer 104 and may be transported between the positive cell 102a and the negative cell 102b. In addition, some of the vanadium active material ions $V^{2+}$, $V^{3+}$, $V^{4+}$, and $V^{5+}$ may also pass through the ion exchange layer 104.

According to some embodiments of the inventive concept, in the case where the redox flow battery RFB is fully charged (i.e., SOC=100%), the vanadium active material in the first electrolytic solution may exist only in the form of $V^{5+}$ ions, and the vanadium active material in the second electrolytic solution may exist only in the form of $V^{2+}$ ions. In the case where the redox flow battery RFB is fully discharged (i.e., SOC=0%), the vanadium active material in the first electrolytic solution may exist only in the form of $V^{4+}$ ions, and the vanadium active material in the second electrolytic solution may exist only in the form of $V^{3+}$ ions. In the case where the redox flow battery RFB is half charged (i.e., SOC=50%), the vanadium active material in the first electrolytic solution may contain $V^{5+}$ ions and $V^{4+}$ ions that are present in a ratio of 1:1, and the vanadium active material in the second electrolytic solution may contain $V^{2+}$ ions and $V^{3+}$ ions that are present in a ratio of 1:1.

Figure 2:
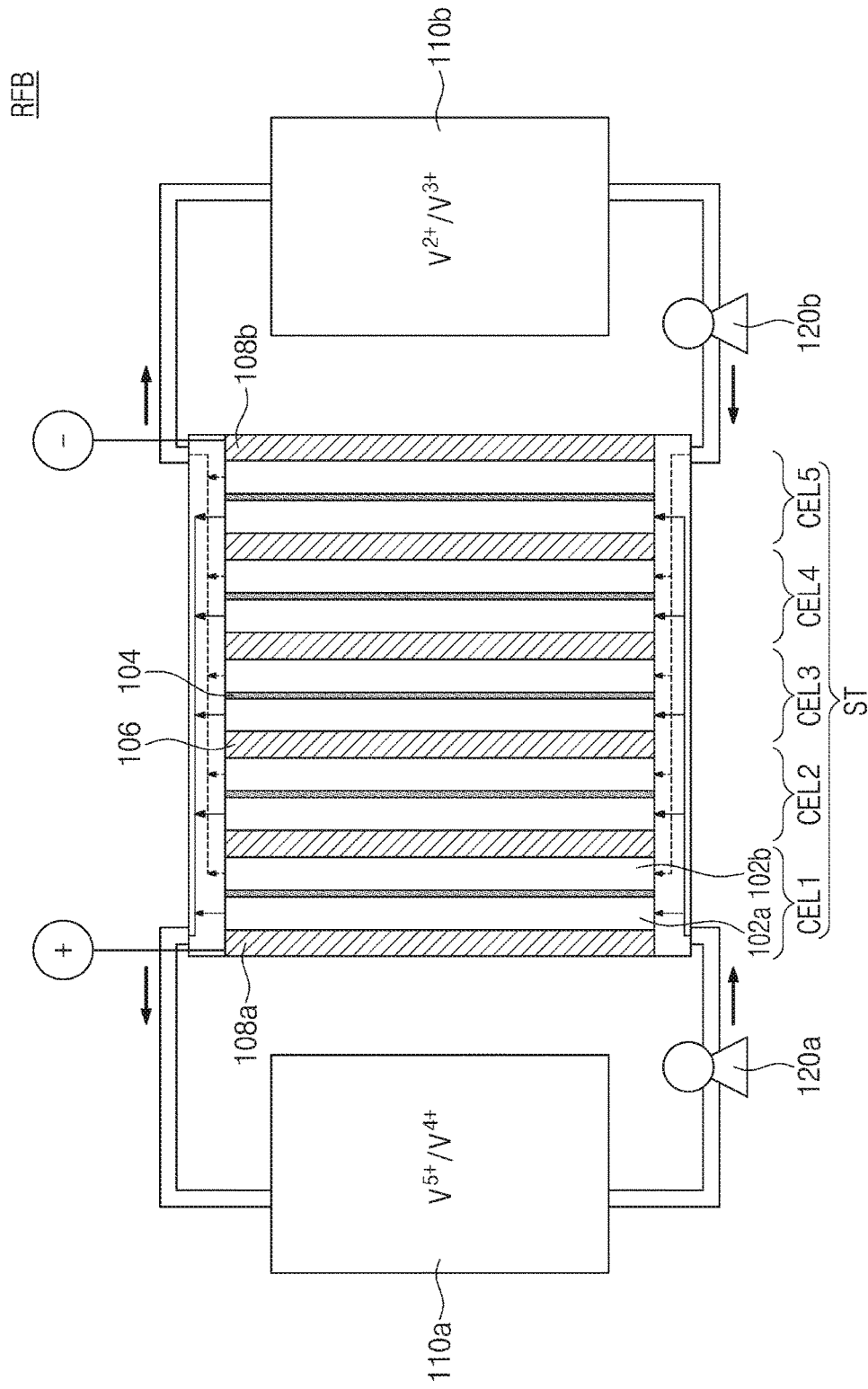
FIG. 2 is a diagram schematically illustrating a stack of a redox flow battery according to some embodiments of the inventive concept.

FIG. 2 is a diagram schematically illustrating a stack of a redox flow battery according to some embodiments of the inventive concept. Referring to FIG. 2, a redox flow battery RFB, according to some embodiments of the inventive concept, may include a stack ST, a first storage tank 110a, a first pump 120a, a second storage tank 110b, and a second pump 120b. The stack ST may include a plurality of cells CEL1-CEL5. The stack ST may include, for example, first to fifth the cells CEL1-CEL5. Each of the first to fifth the cells CEL1-CEL5 may be configured to have substantially the same or similar features as those of the cell CEL previously described with reference to FIG. 1.

In detail, each of the first to fifth the cells CEL1-CEL5 may include an ion exchange layer 104. Bipolar electrodes 106 may be disposed between the first to fifth the cells CEL1-CEL5. An adjacent pair of the cells may share a corresponding one of the bipolar electrodes 106.

For example, when viewed with reference to the first cell CEL1, the bipolar electrode 106 between the first and second cells CEL1 and CEL2 may correspond to the second electrode 106b previously described with reference to FIG. 1. When viewed with reference to the second cell CEL2, the bipolar electrode 106 between the first and second cells CEL1 and CEL2 may correspond to the first electrode 106a previously described with reference to FIG. 1. During the discharging of the redox flow battery, electrons may be transferred to the bipolar electrode 106 from a negative cell 102b of the first cell CEL1, and the electrons transferred to the bipolar electrode 106 may be transferred to a positive cell 102a of the second cell CEL2. During the charging of the redox flow battery, electrons may be transferred to the bipolar electrode 106 from the positive cell 102a of the second cell CEL2, and the electrons transferred to the bipolar electrode 106 may be transferred to the negative cell 102b of the first cell CEL1.

A first collection electrode 108a and a second collection electrode 108b may be provided at both ends of the stack ST. The first collection electrode 108a may be provided adjacent to the positive cell 102a of the first cell CEL1, and the second collection electrode 108b may be provided adjacent to the negative cell 102b of the fifth cell CEL5. As an example, the first collection electrode 108a may be a positive electrode, the second collection electrode 108b may be a negative electrode.

The first electrolytic solution may be supplied into the positive cells 102a of the first to fifth the cells CEL1-CEL5 from the first storage tank 110a through the first pump 120a. The second electrolytic solution may be supplied into the negative cells 102b of the first to fifth the cells CEL1-CEL5 from the second storage tank 110b through the second pump 120b. In some embodiments, all of the first to fifth the cells CEL1-CEL5 in the stack ST may be configured to share the first electrolytic solution in the first storage tank 110a. All of the first to fifth the cells CEL1-CEL5 in the stack ST may be configured to share the second electrolytic solution in the second storage tank 110b.

As shown in FIG. 2, the first to fifth the cells CEL1-CEL5 may be provided in the stack ST, but the inventive concept is not limited thereto. For example, the number and arrangement of cells in the stack ST may be variously changed by those skilled in the art.

Figure 3:
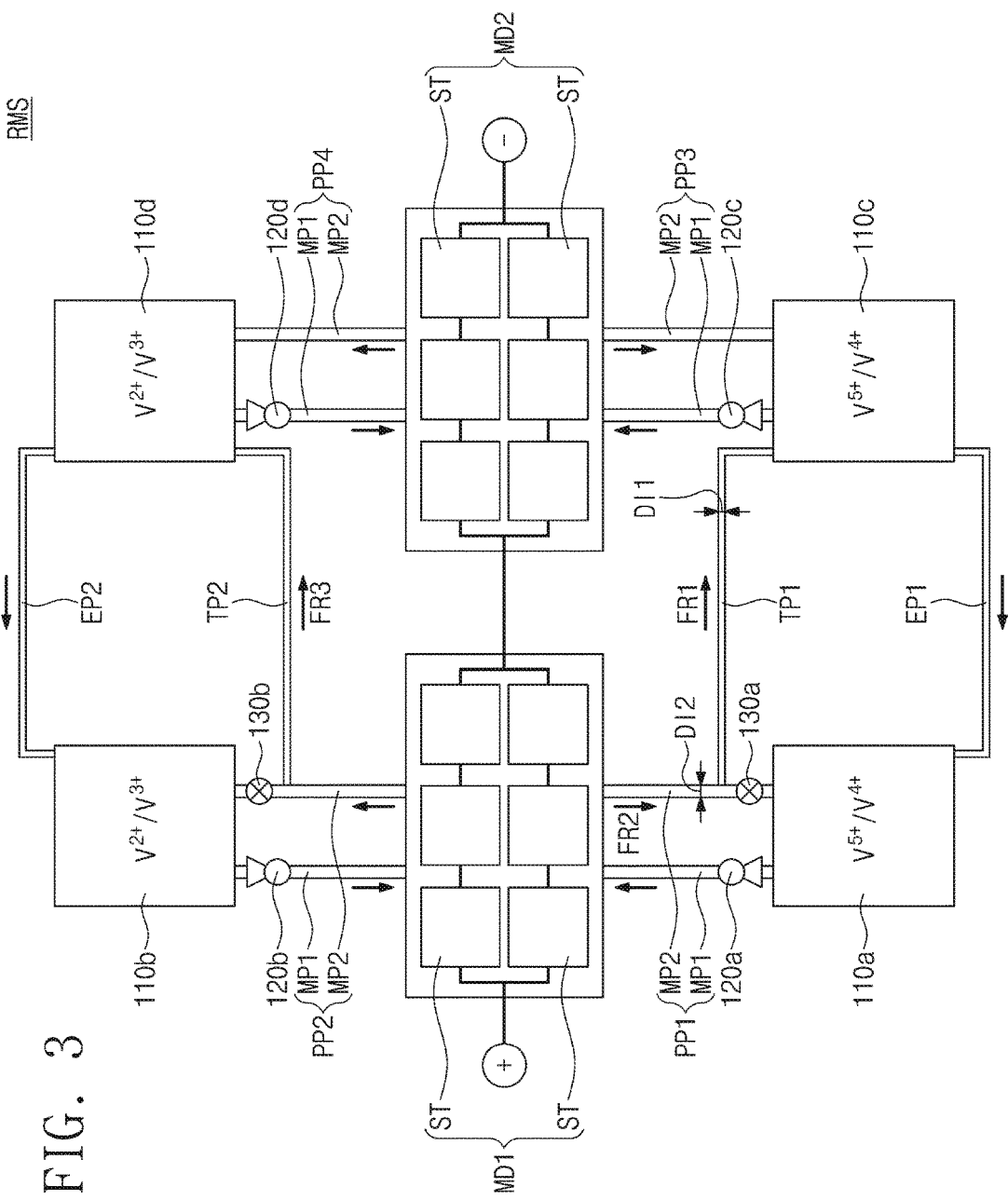
FIG. 3 is a diagram schematically illustrating a module system of a redox flow battery according to some embodiments of the inventive concept.

FIG. 3 is a diagram schematically illustrating a module system of a redox flow battery according to some embodiments of the inventive concept. Referring to FIG. 3, a module system RMS of a redox flow battery according to some embodiments of the inventive concept may include a first module MD1 and a second module MD2. Each of the first and second modules MD1 and MD2 may include a plurality of stacks ST. Each of the stacks ST may be configured to have substantially the same or similar features as those of the stack ST previously described with reference to FIG. 2. For example, each of the stacks ST may include a plurality of cells (e.g., see the cell CEL of FIG. 1).

In each of the first and second modules MD1 and MD2, the stacks ST may be connected in series or parallel to each other. As an example, in the first module MD1, upper three of the stacks ST may be connected in series to each other, and lower three of the stacks ST may be connected in series to each other. Series-connected upper ones of the stacks ST and series-connected lower ones of the stacks ST may be connected in parallel to each other. As a result of such electrical connection between the stacks ST, each of the first and second modules MD1 and MD2 may have a single positive electrode and a single negative electrode.

In some embodiments, the first and second modules MD1 and MD2 may be connected in series to each other. For example, a negative electrode of the first module MD1 and a positive electrode of the second module MD2 may be connected to each other. In certain embodiments, although not shown, the first and second modules MD1 and MD2 may be connected in parallel to each other, but the inventive concept is not limited thereto.

The first module MD1 may be fluidically connected to a first storage tank 110a through a first pipe set PP1. The first module MD1 may be fluidically connected to a second storage tank 110b through a second pipe set PP2. The second module MD2 may be fluidically connected to a third storage tank 110c through a third pipe set PP3. The second module MD2 may be fluidically connected to a fourth storage tank 110d through a fourth pipe set PP4. The first electrolytic solution may be stored in the first storage tank 110a and the third storage tank 110c, and the second electrolytic solution may be stored in the second storage tank 110b and the fourth storage tank 110d. As an example, the first to fourth storage tanks 110a-110d may have substantially the same size.

The first electrolytic solution and the second electrolytic solution may circulate through the first module MD1, and the first electrolytic solution and the second electrolytic solution may circulate through the second module MD2. For example, the first electrolytic solution may circulate between the first module MD1 and the first storage tank 110a through the first pipe set PP1. The second electrolytic solution may circulate between the first module MD1 and the second storage tank 110b through the second pipe set PP2.

Each of the first to fourth pipe sets PP1-PP4 may include a first main pipe MP1 and a second main pipe MP2. For example, the first electrolytic solution in the first storage tank 110a may be supplied into the first module MD1 through the first main pipe MP1 of the first pipe set PP1. The first electrolytic solution supplied into the first module MD1 may be distributed to the stacks ST in the first module MD1. If the oxidation-reduction reaction in the first module MD1 is finished, the first electrolytic solution may be supplied into the first storage tank 110a through the second main pipe MP2 of the first pipe set PP1. The second electrolytic solution in the second storage tank 110b may be supplied into the first module MD1 through the first main pipe MP1 of the second pipe set PP2. The second electrolytic solution supplied into the first module MD1 may be distributed to the stacks ST in the first module MD1. If the oxidation-reduction reaction in the first module MD1 is finished, the second electrolytic solution may be supplied into the second storage tank 110b through the second main pipe MP2 of the second pipe set PP2.

First to fourth pumps 120a-120d may be provided on the first to fourth pipe sets PP1-PP4, respectively. The first to fourth pumps 120a-120d may be provided on the first main pipes MP1 of the first to fourth pipe sets PP1-PP4. A first valve 130a may be provided on the second main pipe MP2 of the first pipe set PP1, and a second valve 130b may be provided on the second main pipe MP2 of the second pipe set PP2. For example, the first pump 120a may be configured to allow the first electrolytic solution to be supplied into the first module MD1 through the first main pipe MP1 of the first pipe set PP1. The first valve 130a may be used to adjust an internal pressure of the second main pipe MP2 of the first pipe set PP1.

A first transfer pipe TP1 and a first equilibrium pipe EP1 may be provided between the first storage tank 110a and the third storage tank 110c. A second transfer pipe TP2 and a second equilibrium pipe EP2 may be provided between the second storage tank 110b and the fourth storage tank 110d. The first transfer pipe TP1 and the first equilibrium pipe EP1 may be configured to allow for fluid communication between the first electrolytic solution of the first module MD1 and the first electrolytic solution of the second module MD2. For example, the first electrolytic solution of the first module MD1 may be supplied into the second module MD2 through the first transfer pipe TP1, and the first electrolytic solution of the second module MD2 may be supplied into the first module MD1 through the first equilibrium pipe EP1. The second transfer pipe TP2 and the second equilibrium pipe EP2 may be configured to allow for fluid communication between the second electrolytic solution of the first module MD1 and the second electrolytic solution of the second module MD2. For example, the second electrolytic solution of the first module MD1 may be supplied into the second module MD2 through the second transfer pipe TP2, and the second electrolytic solution of the second module MD2 may be supplied into the first module MD1 through the second equilibrium pipe EP2.

A one end of the first transfer pipe TP1 may be connected to the second main pipe MP2 of the first pipe set PP1, and an opposite end of the first transfer pipe TP1 may be connected to the third storage tank 110c. If the oxidation-reduction reaction in the first module MD1 is finished, a part of the first electrolytic solution may be supplied into the third storage tank 110c through the first transfer pipe TP1. For example, the first electrolytic solution may be supplied into the third storage tank 110c at a first flow rate FR1 through the first transfer pipe TP1.

The first transfer pipe TP1 may be connected to a portion of the second main pipe MP2 located at a front side of the first valve 130a. The first transfer pipe TP1 may have a first diameter DI1. The second main pipe MP2 may have a second diameter DI2. The first diameter DI1 may be less than the second diameter DI2. The first electrolytic solution discharged from the first module MD1 may flow through the second main pipe MP2 at a second flow rate FR2. The second flow rate FR2 may be higher than the first flow rate FR1. For example, a part of the first electrolytic solution flowing at the second flow rate FR2 may be provided into the first transfer pipe TP1 and may flow through the first transfer pipe TP1 at the first flow rate FR1. If, unlike that shown in FIG. 3, the first diameter DI1 is larger than the second diameter DI2, an amount of a shunt current between the first and second modules MD1 and MD2 to be described below may be relatively large.

By control the internal pressure of the second main pipe MP2 using the first valve 130a, it may be possible to control the first flow rate FR1. For example, if the opened size of the first valve 130a is increased, the internal pressure of the second main pipe MP2 and the first flow rate FR1 may be decreased. By contrast, if the opened size of the first valve 130a is decreased, the pressure of the second main pipe MP2 and the first flow rate FR1 may be increased.

A one end of the first equilibrium pipe EP1 may be connected to the first storage tank 110a, and an opposite end of the first equilibrium pipe EP1 may be connected to the third storage tank 110c. As an example, the one end of the first equilibrium pipe EP1 may be connected to a bottom of the first storage tank 110a, and the opposite end of the first equilibrium pipe EP1 may be connected to a bottom of the third storage tank 110c. The first electrolytic solution may be supplied into the first storage tank 110a from the third storage tank 110c through the first equilibrium pipe EP1. For example, the first electrolytic solution may be supplied into the first storage tank 110a, at substantially the same flow rate as the first flow rate FR1, through the first equilibrium pipe EP1.

In the case where the first electrolytic solution is supplied into the third storage tank 110c through the first transfer pipe TP1, a level of the first electrolytic solution in the third storage tank 110c may be elevated. In the case where the level of the first electrolytic solution in the third storage tank 110c is higher than that of the first electrolytic solution in the first storage tank 110a, a difference in pressure between the two opposite ends of the first equilibrium pipe EP1 may occur. The pressure difference may act as a driving force causing the flow of the first electrolytic solution from the third storage tank 110c to the first storage tank 110a. This may make it possible to constantly maintain not only the amount of the first electrolytic solution in the first storage tank 110a but also the amount of the first electrolytic solution in the third storage tank 110c. In other words, the first equilibrium pipe EP1 may be configured to allow the first electrolytic solution in the first storage tank 110a to have substantially the same level as that of the first electrolytic solution in the third storage tank 110c.

The second electrolytic solution may be exchanged between the second storage tank 110b and the fourth storage tank 110d through the second transfer pipe TP2 and the second equilibrium pipe EP2. The second electrolytic solution may flow through the second transfer pipe TP2 at a third flow rate FR3. The third flow rate FR3 may be substantially the same as the first flow rate FR1. Except that there is the flow of the second electrolytic solution, the second transfer pipe TP2 and the second equilibrium pipe EP2 may be configured to have substantially the same features as the first transfer pipe TP1 and the first equilibrium pipe EP1 described above.

A one end of the second equilibrium pipe EP2 may be connected to a bottom of the second storage tank 110b, and an opposite end of the second equilibrium pipe EP2 may be connected to a bottom of the fourth storage tank 110d. Meanwhile, in FIG. 3, the second equilibrium pipe EP2 is drawn as if it is connected to top surfaces of the second and fourth storage tanks 110b and 110d, but it will be understood by those skilled in the art that this configuration is just an intended distortion in the purpose of reducing complexity in the drawings.

Figure 4:
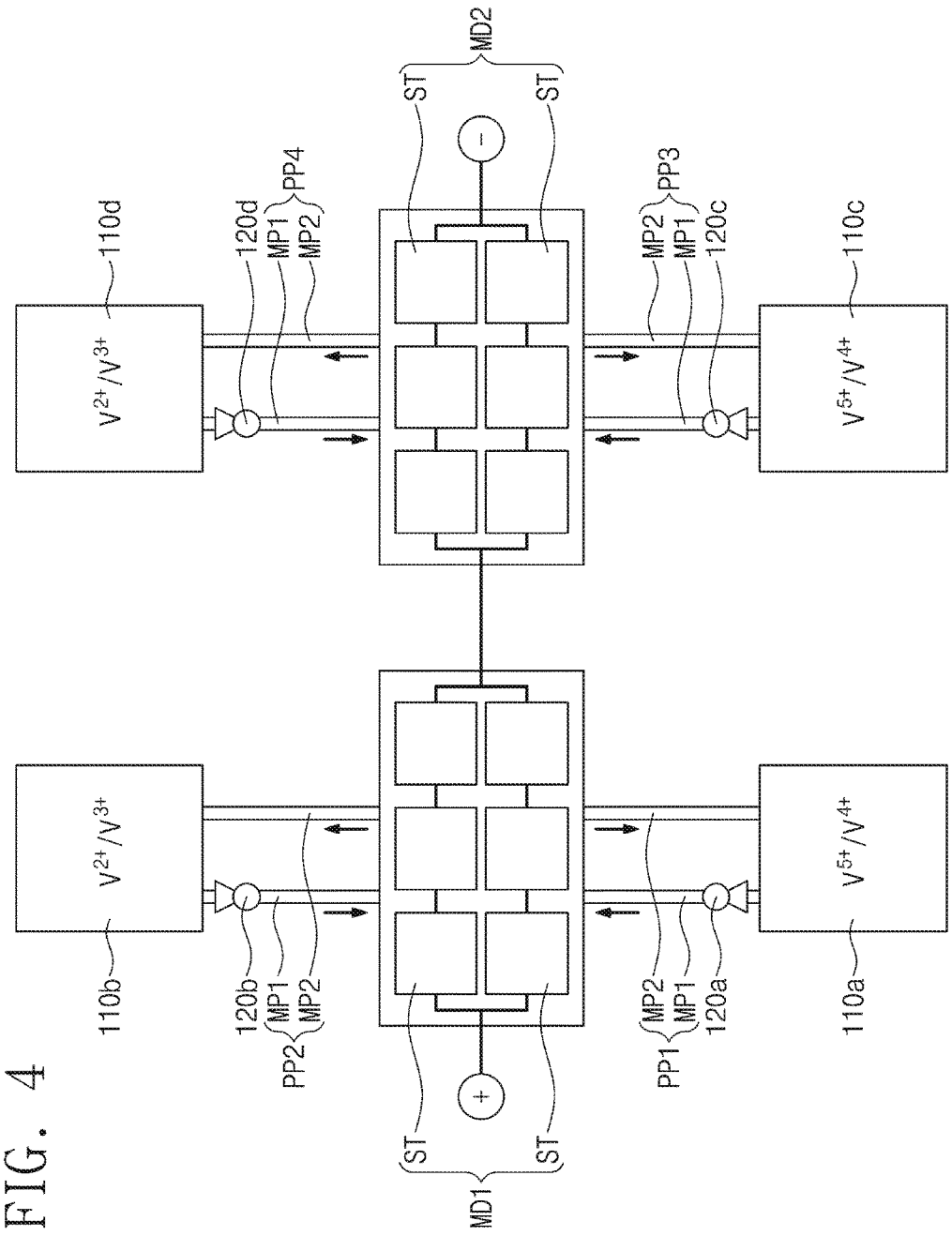
FIG. 4 is a diagram schematically illustrating a module system of a redox flow battery according to a comparative example.

FIG. 4 is a diagram schematically illustrating a module system of a redox flow battery according to a comparative example. Referring to FIG. 4, the first and second transfer pipes TP1 and TP2, the first and second equilibrium pipes EP1 and EP2, and the first and second valves 130a and 130b, which are provided as parts of the module system RMS of FIG. 3, may be omitted from a module system RMSa of a redox flow battery according to a comparative example.

The first to fourth storage tanks 110a-110d may be completely separated from each other. For example, the first electrolytic solution flowing through the first module MD1 may be completely separated from the first electrolytic solution flowing the second module MD2. The second electrolytic solution flowing through the first module MD1 may be completely separated from the second electrolytic solution flowing through the second module MD2.

In the present comparative example, the module system RMSa may execute a charging or discharging operation, according to an operation mode of an external power or load connected to the module system RMSa. In the case where the charging or discharging operation is repeated, due to an increase in total operating time, there may be a difference in the state-of-charge (SOC) between the first and second modules MD1 and MD2. This may be because any of the first electrolytic solution and the second electrolytic solution is not shared by the first and second modules MD1 and MD2.

That is, the repetition of the charging or discharging operation may lead to a difference in a ratio of $V^{5+}$ ions to $V^{4+}$ ions between the first electrolytic solution in the first storage tank 110a and the first electrolytic solution in the third storage tank 110c. Also, the repetition of the charging or discharging operation may lead to a difference in a ratio of $V^{2+}$ ions to $V^{3+}$ ions between the second electrolytic solution in the second storage tank 110b and the second electrolytic solution in the fourth storage tank 110d.

The afore-described difference in SOC between the modules may cause a reduction in battery usage range of the entire module system. Furthermore, the difference in SOC between the modules may increase the risk of over-charging or over-discharging.

Figure 5:
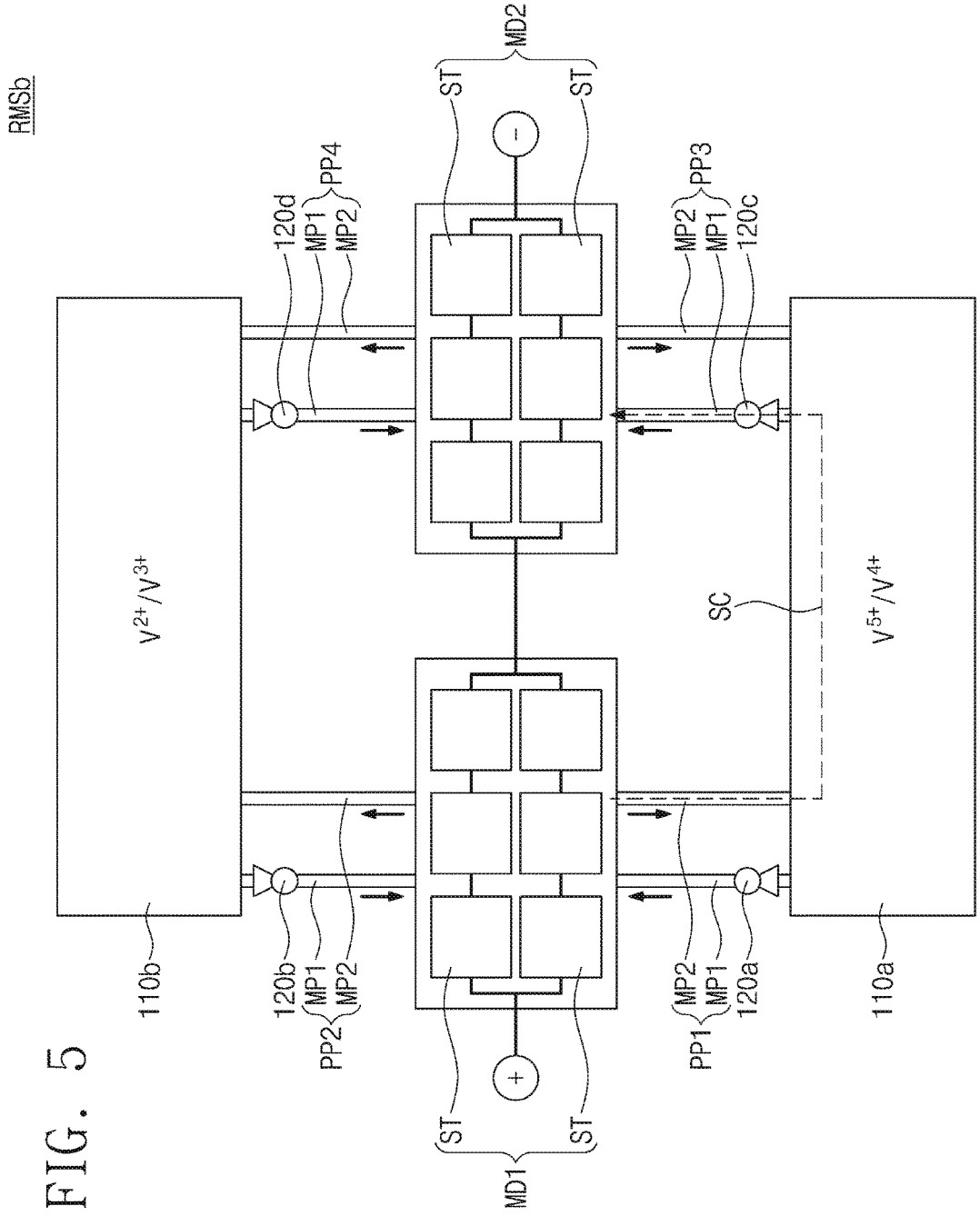
FIG. 5 is a diagram schematically illustrating a module system of a redox flow battery according to another comparative example.

FIG. 5 is a diagram schematically illustrating a module system of a redox flow battery according to another comparative example. Referring to FIG. 5, a module system RMSb of a redox flow battery according to another comparative example may include a first storage tank 110a and a second storage tank 110b. When compared with the module system RMSa previously described with reference to FIG. 4, the first storage tank 110a of the module system RMSb may correspond to a combined structure, in which the first and third storage tanks 110a and 110c of the module system RMSa are connected to each other, and the second storage tank 110b may correspond to a combined structure, in which the second and fourth storage tanks 110b and 110d of the module system RMSa are connected to each other.

The first module MD1 and the second module MD2 may share in common the first storage tank 110a, in which the first electrolytic solution is stored. The first module MD1 and the second module MD2 may share in common the second storage tank 110b, in which the second electrolytic solution is stored.

In the module system RMSb according to the comparative example, the first and second modules MD1 and MD2 may share the entirety of the first electrolytic solution, the first and second modules MD1 and MD2 may share the entirety of the second electrolytic solution. This may make it possible to prevent the SOC difference from occurring between the first and second modules MD1 and MD2, unlike the module system RMSa described with reference to FIG. 4.

However, in the module system RMSb according to the comparative example, a shunt current SC may be produced between the first and second modules MD1 and MD2. A large voltage difference may occur between at least one of the stacks ST of the first module MD1 and at least one of the stacks ST of the second module MD2. This may be because the stacks ST in the first and second modules MD1 and MD2 are connected in series to each other and the first and second modules MD1 and MD2 are also connected in series to each other.

The shunt current SC may be produced to reduce the voltage difference between the at least one of the stacks ST of the first module MD1 and at least one of the stacks ST of the second module MD2. The shunt current SC may flow from the first module MD1 to the second module MD2 through the first electrolytic solution. For example, the shunt current SC may flow from the first module MD1 to the second module MD2 through the first pipe set PP1, the first storage tank 110a, and the third pipe set PP3.

In the module system RMSb according to the present comparative example, the first and second electrolytic solutions in the first and second storage tanks 110a and 110b may act as a low-resistance conductive line, and this may allow for a relatively-large amount of the shunt current. Since, in order to reduce the voltage difference, the shunt current SC occurs in a direction allowing for energy discharging, an amount of energy loss caused by the shunt current SC may be in proportion to an amount and time of the shunt current SC. This may deteriorate the total energy efficiency of the module system RMSb.

Referring back to FIGS. 3 to 5, unlike the module system RMSa of FIG. 4, the module system RMS may be configured to allow the first electrolytic solution to be exchanged between the first and second modules MD1 and MD2 through the first transfer and equilibrium pipes TP1 and EP1 and to allow the second electrolytic solution to be exchanged between the first and second modules MD1 and MD2 through the second transfer and equilibrium pipes TP2 and EP2. Thus, the technical difficulty (e.g., the difference in SOC between the modules) in the module system RMSa of FIG. 4 may be prevented in the module system RMS.

Unlike the module system RMSb of FIG. 5, in the module system RMS, the first and third storage tanks 110a and 110c may be separated from each other and the second and fourth storage tanks 110b and 110d may be separated from each other. In addition, the first transfer pipe TP1 connecting the first storage tank 110a to the third storage tank 110c may have a relatively small diameter (e.g., DI1). Resistance of a conductive line is directly proportional to its length and is inversely proportional to its area. Since a sectional area of the first transfer pipe TP1 is relatively small, resistance of the first electrolytic solution in the first transfer pipe TP1 may be relatively high. Thus, even when a shunt current occurs between the first and second modules MD1 and MD2, it may be possible to reduce an amount of the shunt current, due to the high resistance of the first electrolytic solution in the first transfer pipe TP1.

SOC balancing of the module system RMS according to some embodiments of the inventive concept will be described with reference to FIG. 3. The SOC balancing may refer to a process reducing a difference in SOC between modules in a module system. To realize the SOC balancing between the first and second modules MD1 and MD2, the first electrolytic solution may be exchanged between the first and second modules MD1 and MD2 through the first transfer pipe TP1 and the first equilibrium pipe EP1. In the case where the first flow rate FR1 of the first electrolytic solution is increased, the difference in SOC between the first and second modules MD1 and MD2 may be easily reduced. However, in order to increase the first flow rate FR1, it may be necessary to increase the diameter DI1 of the first transfer pipe TP1, but this may lead to an increase of the shunt current.

The first flow rate FR1 of the first electrolytic solution for the SOC balancing between the first and second modules MD1 and MD2 may be given by the following formula 1.

[Formula 1]

$$\text{First flow rate}\left(\frac{\text{liter}}{\text{hour}}\right) = \text{Amount of electrolyte per each module (liter)} \times$$

$$\text{Difference in energy capacity between modules per cycle}\left(\frac{\%}{\text{cycle}}\right) \div$$
$$\text{Cycle time}\left(\frac{\text{hour}}{\text{cycle}}\right)$$

For example, in the case where an amount of the first electrolytic solution in each of the first and third storage tanks 110a and 110c is 10,000 L, a difference in energy capacity between the first and second modules MD1 and MD2 per each cycle is 0.1%, and an execution time of each cycle is 10 hours, the first flow rate FR1 is 1 L/hr (=10,000×0.001×1/10). Here, each cycle may refer to the time taken for the module system RMS to discharge from the fully-discharged state to the fully-charged state and then to discharge again until it is fully discharged. The first flow rate FR1 given by the formula 1 may be adjusted by controlling the first valve 130a. Meanwhile, as in the above example, the first flow rate FR1 may be relatively very small, compared with the amount of the electrolytic solution stored in a storage tank. Accordingly, even when the diameter DI1 of the first transfer pipe TP1 is relatively small, it may be possible to effectively realize the SOC balancing of the module system RMS.

Hereinafter, a method of calculating the resistance of the first transfer pipe TP1, according to some embodiments of the inventive concept, will be described with reference to FIG. 3. In addition, a way of calculating a diameter and a length of the first transfer pipe TP1 based on the calculated resistance of the first transfer pipe TP1 will be described below.

Figure 6:
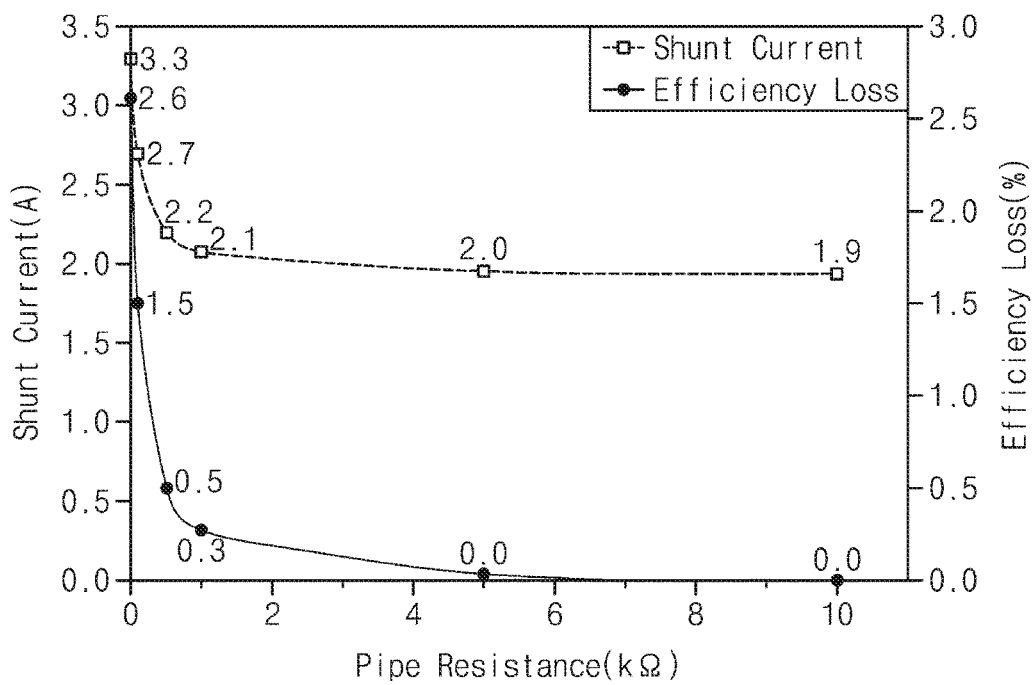
FIG. 6 is a simulation graph showing a shunt current in a module system, according to some embodiments of the inventive concept, and efficiency loss caused by the shunt current.

FIG. 6 is a simulation graph showing a shunt current in a module system, according to some embodiments of the inventive concept, and efficiency loss caused by the shunt current. In the graph of FIG. 6, efficiency loss at the highest resistance of 10 kΩ is set to a reference value of "0". FIG. 6 shows how the efficiency loss with respect to the reference value changes, when the resistance is lower than the highest value of 10 kΩ Referring to FIG. 6, in some embodiments of the inventive concept, each of the first and second modules MD1 and MD2 may be a 125 kW module. Each of the first and second modules MD1 and MD2 may include 500 cells. As shown in FIG. 3, each of the first and second modules MD1 and MD2 may include a plurality of stacks, but in certain embodiments, it may include only a single stack consisting of 500 cells. FIG. 6 shows the result of the simulation about an amount of a shunt current, which may be produced when the first and second modules MD1 and MD2 are configured in the above-described manner.

Referring to FIG. 6, as the resistance of the first transfer pipe TP1 is decreased, the shunt current is increased. In particular, FIG. 6 shows that the shunt current is exponentially increased when the resistance of the first transfer pipe TP1 is lower than 0.5 kΩ The efficiency loss in the module system caused by the shunt current may be in proportion to the shunt current. Thus, FIG. 6 shows that the efficiency loss is exponentially increased when the resistance of the first transfer pipe TP1 is lower than 0.5 kΩ.

To reduce the efficiency loss, the resistance of the first transfer pipe TP1 may be increased. The higher the resistance of the first transfer pipe TP1, the lower the diameter DI1 of the first transfer pipe TP1. If the diameter DI1 of the first transfer pipe TP1 is reduced, the first flow rate FR1 of the first electrolytic solution may be decreased, thereby causing a difference in SOC between modules, similar to the module system RMSa of FIG. 4. In the case where, to reduce the SOC difference, the first flow rate FR1 of the first electrolytic solution is increased, the shunt current and the efficiency loss may be increased, as described above. According to some embodiments of the inventive concept, a resistance range of the first transfer pipe TP1 may be suitably determined in consideration of the efficiency loss and the SOC balancing, and the first transfer pipe TP1 may be designed based on the determined resistance range. For example, according to the result of FIG. 6, the first transfer pipe TP1 may be designed to have the resistance range from 0.5 kΩ to 1 kΩ.

Figure 7:
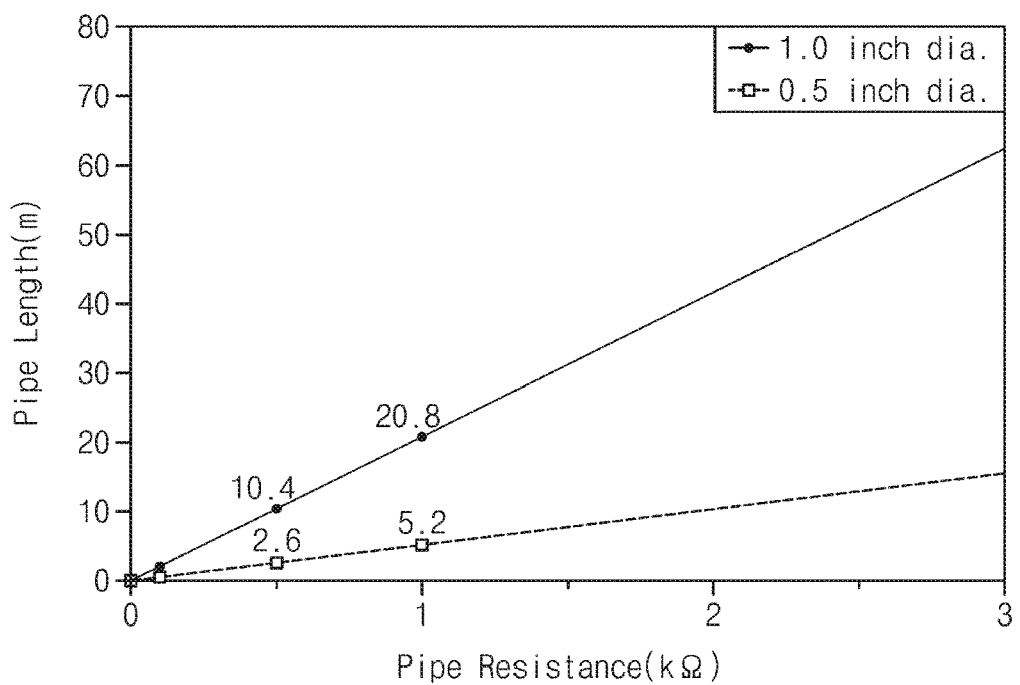
FIG. 7 is a graph showing dependence of resistance on a diameter and a length of a first transfer pipe.

FIG. 7 is a graph showing dependence of resistance on a diameter and a length of a first transfer pipe. In FIG. 7, the solid line depicts a length-dependence of resistance for 0.5-inch pipe, and the dotted line depicts a length-dependence of resistance for 1-inch pipe.

In the case where the resistance of the first transfer pipe TP1 is within a range from 0.5 kΩ to 1 kΩ, FIG. 7 shows that the 0.5-inch pipe has a length ranging from 2.6 m to 5.2 m. In the case where the resistance of the first transfer pipe TP1 is within a range from 0.5 kΩ to 1 kΩ, FIG. 7 shows that the 1-inch pipe has a length ranging from 10.4 m to 20.8 m. In other words, the first transfer pipe TP1 may be configured to have a diameter of 0.5 inch and a length ranging from 2.6 m to 5.2 m. Alternatively, the first transfer pipe TP1 may be configured to have a diameter of 1 inch and a length ranging from 10.4 m to 20.8 m. In such cases, it may be possible to reduce or minimize the efficiency loss of the module system RMS and moreover to achieve the SOC balancing.

The inventive concept is not limited to detailed conditions for the module system RMS and the diameter and the length of the first transfer pipe TP1 that have been exemplarily described with reference to FIGS. 3, 6, and 7, and may be realized in various other embodiments. Diameters and lengths of the transfer and equilibrium pipes of the module system may be determined on the basis of an allowed range for pipe resistance, which may be obtained in consideration of a suitable range for efficiency loss of the module system.

Figure 8:
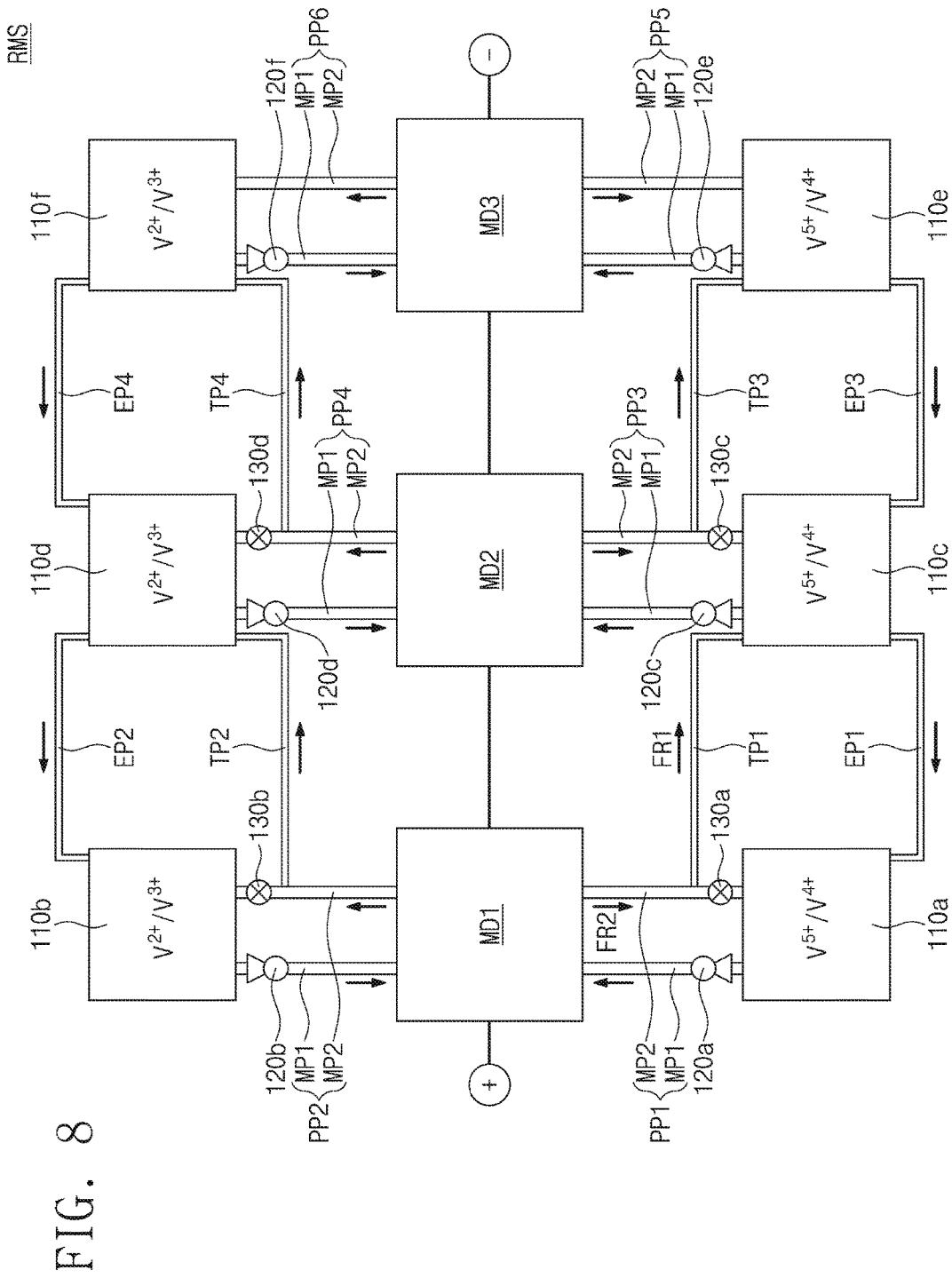
FIG. 8 is a diagram schematically illustrating a module system of a redox flow battery according to some embodiments of the inventive concept.

FIG. 8 is a diagram schematically illustrating a module system of a redox flow battery according to some embodiments of the inventive concept. In the following description, an element previously described with reference to FIG. 3 may be identified by a similar or identical reference number without repeating an overlapping description thereof, for the sake of brevity.

Referring to FIG. 8, a module system RMS of a redox flow battery according to some embodiments of the inventive concept may include a third module MD3, in addition to the first module MD1 and the second module MD2. Each of the first to third modules MD1-MD3 may include a plurality of stacks.

The third module MD3 may be fluidically connected to a fifth storage tank 110e through a fifth pipe set PP5. The third module MD3 may be fluidically connected to a sixth storage tank 110f through a sixth pipe set PP6. The first electrolytic solution may be stored in the fifth storage tank 110e, and the second electrolytic solution may be stored in the sixth storage tank 110f. The first electrolytic solution and the second electrolytic solution may circulate through the third module MD3.

A third transfer pipe TP3 and a third equilibrium pipe EP3 may be provided between the third storage tank 110c and the fifth storage tank 110e. A fourth transfer pipe TP4 and a fourth equilibrium pipe EP4 may be provided between the fourth storage tank 110d and the sixth storage tank 110f. The third transfer pipe TP3 and the third equilibrium pipe EP3 may be configured to allow for fluid communication between the first electrolytic solution of the second module MD2 and the first electrolytic solution of the third module MD3. The fourth transfer pipe TP4 and the fourth equilibrium pipe EP4 may be configured to allow for fluid communication between the second electrolytic solution of the second module MD2 and the second electrolytic solution of the third module MD3.

The module system RMS may be configured to further include an additional module (e.g., a third module MD3), when compared with the module system RMS previously described with reference to FIG. 3. For example, the module system RMS may include three or more modules. In the module system RMS according to some embodiments of the inventive concept, the first electrolytic solution may be exchanged between the first to third modules MD1-MD3 through the first transfer and equilibrium pipes TP1 and EP1 and the third transfer and equilibrium pipes TP3 and EP3. The second electrolytic solution may be exchanged between the first to third modules MD1-MD3 through the second transfer and equilibrium pipes TP2 and EP2 and the fourth transfer and equilibrium pipes TP4 and EP4. Thus, the SOC balancing between the first to third modules MD1-MD3 may be performed to prevent the first to third modules MD1-MD3 from having a difference in SOC.

According to some embodiments of the inventive concept, a module system of a redox flow battery is configured to prevent modules from having SOC properties different from each other and to prevent efficiency of the system from being reduced by a shunt current.

While example embodiments of the inventive concepts have been particularly shown and described, it will be understood by one of ordinary skill in the art that variations in form and detail may be made therein without departing from the spirit and scope of the attached claims.

What is claimed is:

1. A module system of a redox flow battery, comprising:
   a first redox flow battery module configured to circulate a first electrolytic solution independently therethrough;
   a second redox flow battery module configured to circulate a second electrolytic solution independently therethrough;
   a first storage tank configured to store the electrolytic solution of the first redox flow battery module;
   a second storage tank configured to store the first second electrolytic solution of the second redox flow battery module;
   a first main pipe set connecting the first redox flow battery module fluidically to the first storage tank, the first main pipe set including a first main pipe and a second main pipe, the first main pipe configured to supply the first electrolytic solution in the first storage tank to the first redox flow battery module, the second main pipe configured to supply the first electrolytic solution in the first redox flow battery module to the first storage tank; and
   a first transfer pipe and a first equilibrium pipe which are configured to allow for fluid communication between the first electrolytic solution of the first redox flow battery module and the second electrolytic solution of the second redox flow battery module,
   wherein the second main pipe has a diameter greater than that of the first transfer pipe.

2. The system of claim 1, wherein the first transfer pipe is configured to allow the first electrolytic solution of the first redox flow battery module to be supplied into the second storage tank therethrough,
   the first equilibrium pipe is configured to allow the second electrolytic solution in the second storage tank to be supplied into the first storage tank therethrough, and
   a flow rate of the first electrolytic solution flowing through the first transfer pipe is substantially the same as that of the second electrolytic solution flowing through the first equilibrium pipe.

3. The system of claim 1, wherein a one end of the first transfer pipe is connected to the second main pipe,
   an opposite end of the first transfer pipe is connected to the second storage tank, and
   a part of the first electrolytic solution flowing through the second main pipe is supplied into the second storage tank through the first transfer pipe.

4. The system of claim 3, further comprising:
   a valve on the second main pipe,
   wherein the valve is configured to control a flow rate of the first electrolytic solution flowing through the first transfer pipe.

5. The system of claim 1, wherein the first equilibrium pipe is configured to allow the first electrolytic solution in the first storage tank to have substantially the same level as that of the second electrolytic solution in the second storage tank.

6. The system of claim 1, wherein the diameter and a length of the first transfer pipe are determined, based on efficiency loss caused by a shunt current between the first and second redox flow battery modules and a state-of-charge balancing between the first and second redox flow battery modules.

7. The system of claim 1, further comprising:
   a third redox flow battery module configured to circulate third electrolytic solution independently therethrough;
   a third storage tank configured to store the third electrolytic solution of the third redox flow battery module; and
   a second transfer pipe and a second equilibrium pipe that are configured to allow for fluid communication between the second electrolytic solution of the second redox flow battery module and the third electrolytic solution of the third redox flow battery module.

8. The system of claim 1, further comprising:
   a pump on the first main pipe,
   wherein the pump and the first main pipe are configured to allow the first electrolytic solution to be supplied from the first storage tank into the first redox flow battery module.

9. The system of claim 1, wherein the first redox flow battery module and the second redox flow battery module are connected in series to each other.

* * * * *